United States Patent
Yeh et al.

(10) Patent No.: US 9,450,453 B2
(45) Date of Patent: Sep. 20, 2016

(54) UNINTERRUPTIBLE POWER SUPPLY SYSTEM WITH ENERGY FEEDBACK TO CHARGERS AND SINUSOIDAL OUTPUT

(71) Applicant: CYBER POWER SYSTEMS INC., Taipei (TW)

(72) Inventors: Shou-Ting Yeh, Taipei (TW); Cheng-Yen Lo, Taipei (TW); Shih-Chin Chi, Taipei (TW); Yen-Nan Liu, Taipei (TW)

(73) Assignee: CYBER POWER SYSTEMS INC., Taipei (TW)

(*) Notice: Subject to any disclaimer, the term of this patent is extended or adjusted under 35 U.S.C. 154(b) by 610 days.

(21) Appl. No.: 14/016,169

(22) Filed: Sep. 2, 2013

(65) Prior Publication Data

US 2015/0061395 A1    Mar. 5, 2015

(51) Int. Cl.
*H02J 9/06*    (2006.01)
*H02J 7/02*    (2016.01)

(52) U.S. Cl.
CPC ............. *H02J 9/062* (2013.01); *H02J 7/022* (2013.01); *Y10T 307/625* (2015.04)

(58) Field of Classification Search
CPC .................................. H02J 9/062; H02J 7/022
See application file for complete search history.

(56) References Cited

U.S. PATENT DOCUMENTS

| | | | | |
|---|---|---|---|---|
| 5,077,652 A * | 12/1991 | Faley | ............... | H02M 3/33507 363/132 |
| 6,094,363 A * | 7/2000 | Cheng | ............... | H02J 9/062 307/64 |
| 6,115,268 A * | 9/2000 | Chang | ............... | H02J 9/062 307/66 |
| 6,175,311 B1 * | 1/2001 | Li | ............... | H02J 9/062 307/64 |
| 2008/0197706 A1 * | 8/2008 | Nielsen | ............... | H02J 1/102 307/66 |
| 2009/0096399 A1 * | 4/2009 | Chen | ............... | H01M 10/44 318/441 |
| 2009/0189571 A1 * | 7/2009 | Lai | ............... | H02J 7/022 320/162 |
| 2012/0256483 A1 * | 10/2012 | Nakashima | ............... | H01M 10/44 307/19 |

OTHER PUBLICATIONS

Specification and drawings of U.S. Appl. No. 13/555,413.

* cited by examiner

*Primary Examiner* — Thienvu Tran
*Assistant Examiner* — Pinping Sun
(74) *Attorney, Agent, or Firm* — patenttm.us

(57) ABSTRACT

An uninterruptible power supply (UPS) system with energy feedback to chargers and sinusoidal output charges a battery pack through a first charger under a mains mode. Under a battery mode, the UPS boosts DC voltage outputted from the battery pack to a higher voltage level through a DC-to-DC conversion module, converts the DC voltage to a sinusoidal AC voltage through a DC-to-AC conversion module, and supplies the sinusoidal AC voltage to a load. When the load has energy storage elements and discharged energy occurs in a power supply loop, a micro-controller unit can control the discharged power to charge the battery pack through a second charger, thereby solving the issue of the discharged power from the energy storage elements of the load and enhancing the operational efficiency of the UPS.

24 Claims, 4 Drawing Sheets

UNINTERRUPTIBLE POWER SUPPLY SYSTEM WITH ENERGY FEEDBACK TO CHARGERS AND SINUSOIDAL OUTPUT

BACKGROUND OF THE INVENTION

1. Field of the Invention

The present invention relates to an uninterruptible power supply (UPS) and more particularly to a UPS with dual chargers and sinusoidal output.

2. Description of the Related Art

With reference to FIG. 4, a conventional UPS has an output filter 71, a charger 72, a transfer switch 73, a DC-to-DC controller 74, a battery pack 75, a DC-to-DC conversion module 76 and an inverter 77. An input terminal of the output filter 71 is connected to an AC mains. The charger 72 and the transfer switch 73 are connected to an output terminal of the output filter 71. The transfer switch 73 has a first contact, a second contact and a common contact. The second contact is connected to the output terminal of the output filter 71. The common contact serves as a power output terminal connected to a load. When the mains power is normal, the charger 72 is controlled by the DC-to-DC controller 74 to charge the battery pack 75. An input terminal of the DC-to-DC conversion module 76 is connected to the battery pack 75. An input terminal of the inverter 77 is connected to the output terminal of the DC-to-DC conversion module 76, and an output terminal of the inverter 77 is connected to the second contact of the transfer switch 73.

When the mains power is normal, the mains power passes through the output filter 71, the first contact and the common contact of the transfer switch 73 to supply power to the load. When the mains power is abnormal, the transfer switch is switched to disconnect the first contact from the common contact, and to connect the second contact with the common contact so as to enter a battery mode. Under the battery mode, the DC-to-DC conversion module 76 boosts the DC voltage of the battery pack 75 and outputs the DC voltage to the inverter 77 for the inverter 77 to convert the DC voltage into an AC voltage and supply power to the load through the transfer switch 73.

Although the foregoing off-line UPS can supply backup power when the mains power is abnormal, its application is limited to the resistive loads or current loads because of its square wave output. In the case of inductive loads or mixed loads, the load equipment connected to the off-line UPS may be damaged. On the other hand, as the output of on-line UPSs has a sinusoidal waveform identical to that of the mains power, the on-line UPSs are applicable to inductive loads, purely capacitive loads, and mixed loads. In this regard, the applicant files a China Patent Application CN 20120138935.7, entitled "Method for controlling output waveform of uninterruptible power supplies", which discloses a UPS providing multiple output waveforms for users to selectively switch to one of the output waveforms of the UPS after the UPS enters a battery mode. The output waveforms include a square waveform and a sinusoidal waveform. Accordingly, the output waveforms can be selectable based on the type of load, thereby avoiding damage to the load equipment and enhancing the operation efficiency.

Despite the feasibility of sinusoidal output, if the on-line and off-line UPSs are practically applied to inductive loads, capacitive loads or mixed loads having energy storage elements, those energy storage elements discharge its stored energy in the form of voltage or current to the DC-to-DC conversion modules of the UPSs after the loads are switched off. The energy discharged by the energy storage elements after the loads are switched off is called a "phantom power". Even when the DC-to-DC conversion modules are not operating, the "phantom power" is stored in the circuit loops of the DC-to-DC conversion modules. After the DC-to-DC conversion modules are operating, the "phantom power" is then added to pulsating DC voltage outputted from the DC-to-DC conversion modules to further distort the sinusoidal waves outputted from the inverters. The current approach used to tackle such issue is to consume the "phantom power" by converting it into heat and dissipating the heat. However, such approach results in temperature rise of the UPS and energy waste.

SUMMARY OF THE INVENTION

An objective of the present invention is to provide a UPS system with energy feedback to chargers and sinusoidal output capable of feeding energy discharged from energy storage elements of a load back to an independent charger to charge a battery pack.

To achieve the foregoing objective, the UPS system with energy feedback to chargers and sinusoidal output has a first charger, a battery pack, a DC-to-DC conversion module, a DC-to-AC conversion module, a second charger, a feedback circuit, and a micro-controller unit (MCU).

The first charger has a first power input terminal and a first power output terminal. The first power input terminal is adapted to connect to an AC mains.

The battery pack is connected to the first power output terminal of the first charger.

The DC-to-DC conversion module has an input terminal and an output terminal. The input terminal connected to the battery pack.

The DC-to-AC conversion module has a DC power input terminal and an AC power output terminal. The DC power input terminal is connected to the output terminal of the DC-to-DC conversion module.

The second charger has a second power input terminal, a second power output terminal, and a control terminal. The second power input terminal is connected to the output terminal of the DC-to-DC conversion module. The second power output terminal is connected to the battery pack.

The feedback circuit has at least one signal input terminal and at least one feedback signal output terminal. The at least one signal input terminal is connected to the AC power output terminal of the DC-to-AC conversion module.

The MCU has at least one feedback terminal, multiple driving signal output terminals, and a charging control terminal. The at least one feedback terminal is respectively connected to the at least one feedback signal output terminal. The driving signal output terminals are each respectively connected to the DC-to-DC conversion module and the DC-to-AC conversion module. The charging control terminal is connected to the control terminal of the second charger.

Given the foregoing UPS, the first charger charges the battery pack when the mains power is normal, and the DC-to-DC conversion module boosts DC voltage outputted from the battery pack to a higher voltage level and the DC-to-AC conversion module converts the DC voltage to a sinusoidal AC power and supplies the AC power to a load when the mains power is abnormal. When the load has energy storage elements, the energy storage elements discharge energy to the input terminal of the DC-to-DC conversion module. The MCU detects a load condition from the AC power output terminal of the DC-to-AC conversion module through the feedback circuit to determine the charging timing and the duty cycle value of the second charger.

Accordingly, the benefits of the present invention resides in that the energy discharged by the energy storage elements of the load can be fed back to charge the battery pack through the second charger, thereby solving the issue of the discharged power from the energy storage elements of the load and enhancing the operational efficiency of the UPS.

Other objectives, advantages and novel features of the invention will become more apparent from the following detailed description when taken in conjunction with the accompanying drawings.

DETAILED DESCRIPTION OF THE INVENTION

Figure 1:
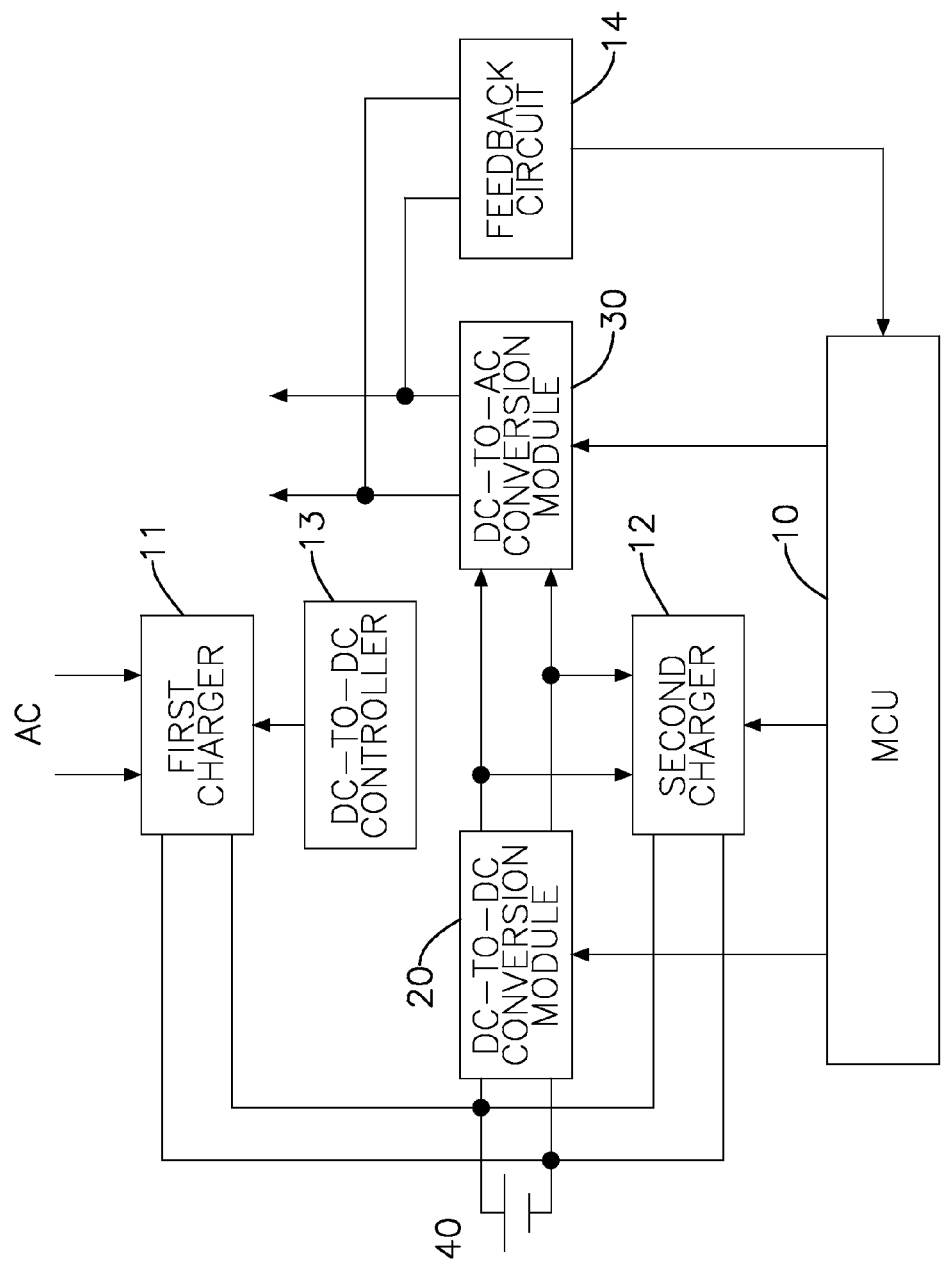
FIG. 1 is a functional block diagram of a basic architecture of a UPS system with energy feedback to chargers and sinusoidal output in accordance with the present invention.

With reference to FIG. 1, a basic architecture of a UPS system with energy feedback to chargers and sinusoidal output in accordance with the present invention is shown. The UPS has a first charger 11, a DC-to-DC controller 13, a DC-to-DC conversion module 20, a DC-to-AC conversion module 30, a second charger 12, a feedback circuit 14, a micro-controller unit (MCU) 10 and a battery pack 40.

The first charger 11 has a first power input terminal, a first power output terminal, and a control terminal. The first power input terminal is connected to an AC mains.

The DC-to-DC controller 13 has an output terminal connected to the control terminal of the first charger 11.

The DC-to-DC conversion module 20 has an input terminal, an output terminal, and at least one control terminal. The output terminal is connected to the control terminal of the first charger 11.

The DC-to-AC conversion module 30 has a DC power input terminal, an AC power output terminal, and at least one control terminal. The DC power input terminal is connected to the output terminal of the DC-to-DC conversion module 20.

The second charger 12 has a second power input terminal, a second power output terminal, and a control terminal. The second power input terminal is connected to the output terminal of the DC-to-DC conversion module 20.

The feedback circuit 14 has at least one signal input terminal and at least one feedback signal output terminal. The signal input terminal is connected to the AC power output terminal of the DC-to-AC conversion module 30.

The MCU 10 has at least one feedback terminal, multiple driving signal output terminals, and a charging control terminal. The at least one feedback terminal is respectively connected to the at least one feedback signal output terminal of the feedback circuit 14. The driving signal output terminals are each respectively connected to the at least one control terminal of the DC-to-DC conversion module 20 and the at least one control terminal of the DC-to-AC conversion module 30. The charging control terminal is connected to the control terminal of the second charger 12.

The battery pack 40 is connected to the first power output terminal of the first charger 11, the input terminal of the DC-to-DC conversion module 20, and the second power output terminal of the second charger 12, and is charged by the first charger 11 under the control of the DC-to-DC controller 13 when the mains power is normal.

Under the foregoing system architecture, when the mains power is abnormal, the first charger 11 stops charging the battery pack 40 and the battery pack 40 starts supplying DC power. The DC power is boosted to a higher voltage level by the DC-to-DC conversion module 20 in generation of a pulsating DC voltage. The pulsating DC voltage is transmitted to the DC-to-AC conversion module 30 and is converted into a sinusoidal AC power by the DC-to-AC conversion module 30 to be supplied to a load. If the load has energy storage elements, the energy storage elements discharge their stored energy in the form of voltage or current to the output terminal of the DC-to-DC conversion module 20 when the load is switched off. The MCU 10 acquires a load condition from the AC power output terminal of the DC-to-AC conversion module 30 through the feedback circuit 14 as a basis for the control over the charging timing and the duty cycle value of the second charger 12 so that the discharged energy to the DC-to-DC conversion module 20 can be outputted from the output terminal of the DC-to-DC conversion module 20 to charge the battery pack 40.

Figure 2:
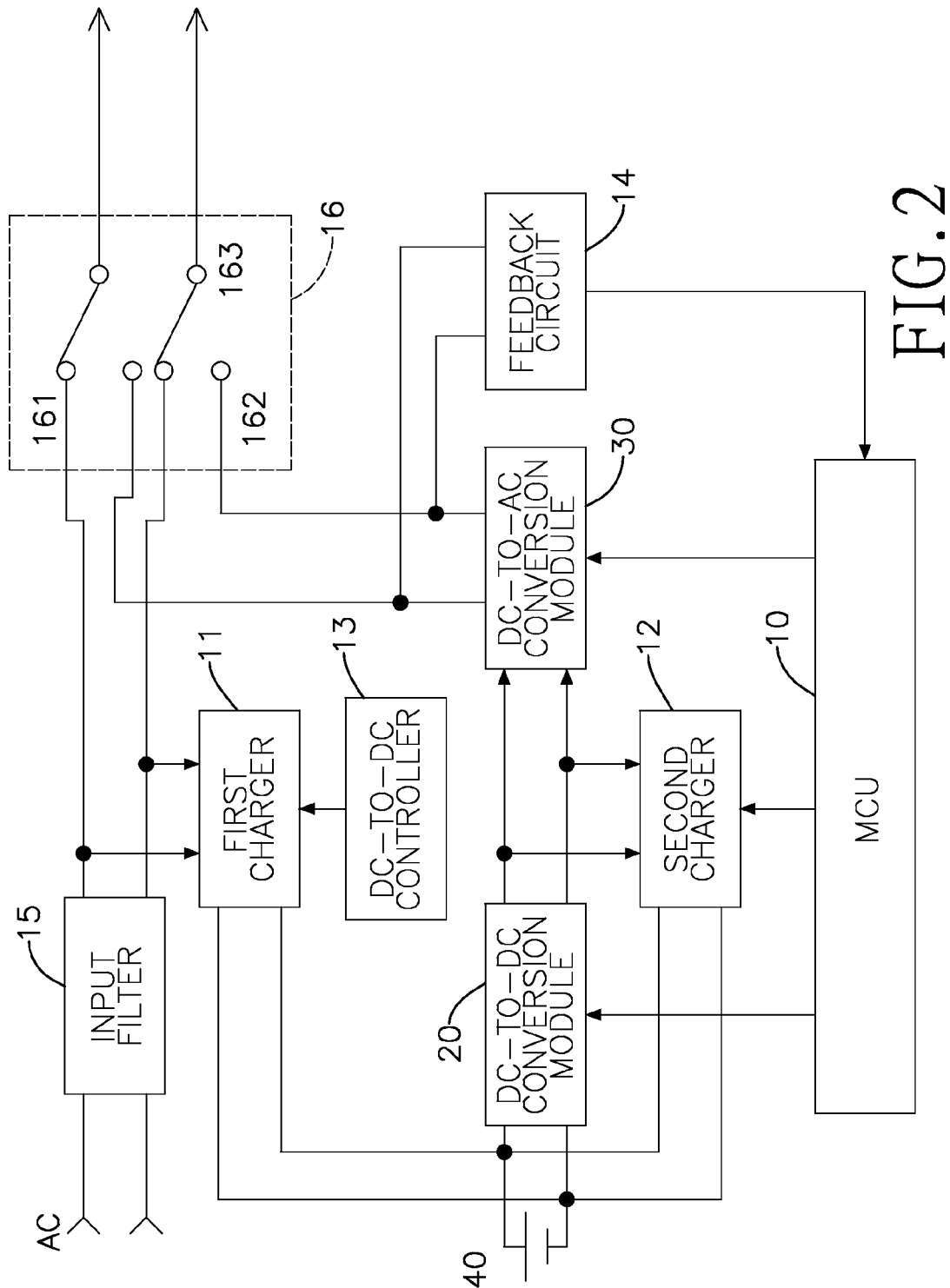
FIG. 2 is a functional block diagram of an embodiment of a UPS system with energy feedback to chargers and sinusoidal output.

With reference to FIG. 2, an embodiment of a UPS system with energy feedback to chargers and sinusoidal output in accordance with the present invention, which is an off-line UPS, is shown. The UPS also inherits the basic architecture of the UPS in FIG. 1, and further has an input filter 15 and a transfer switch 16. The input filter 15 has an input terminal and an output terminal. The input terminal is connected to an AC mains. The output terminal is connected to the first AC power input terminal of the first charger 11 to filter the inputted mains power. The transfer switch 16 has a first contact 161, a second contact 162 and a common contact 163. The common contact 163 serves as a power output terminal switchably connected to the first contact 161 or the second contact 162. In the present embodiment, the first contact 161 is connected to the output terminal of the input filter 15, and the second contact 162 is connected to the AC power output terminal of the DC-to-AC conversion module 30.

When the mains power is normal, besides power supplied to the load through the first contact 161 and the common contact 163 of the transfer switch 16, the mains power charges the battery pack 40 through the first charger 11. When the mains power is abnormal, the common contact 163 of the transfer switch 16 is switched to connect with the second contact 162, and the battery pack 40 starts supplying DC power. The DC power is converted into a pulsating DC power by the DC-to-DC conversion module 20, the pulsating DC power is converted into a sinusoidal AC power by the DC-to-AC conversion module 30, and the sinusoidal AC power is supplied to the load through the second contact 162 and the common contact 163 of the transfer switch 16.

Figure 3:
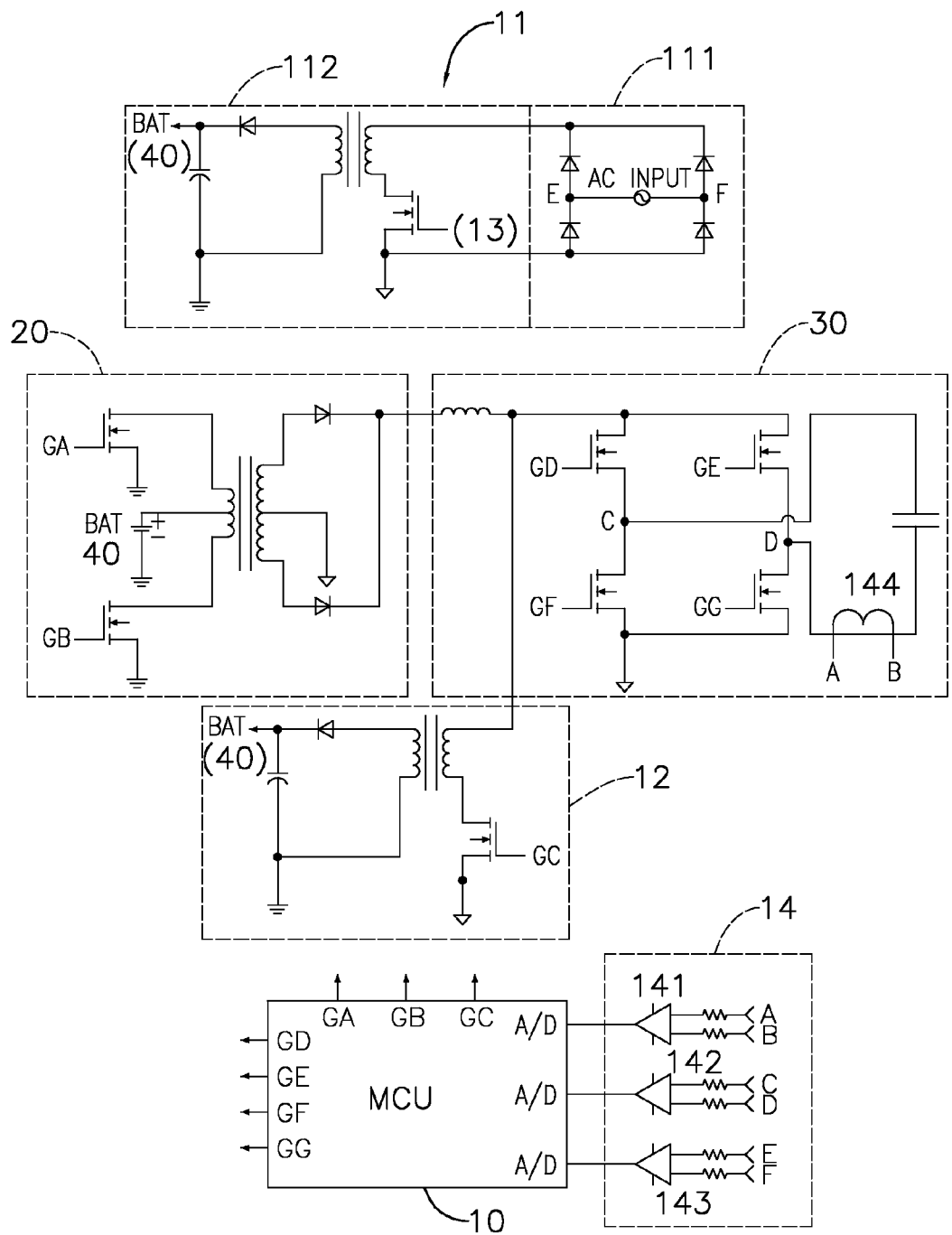
FIG. 3 is a partial circuit diagram of the UPS system in FIG. 2.
Figure 4:
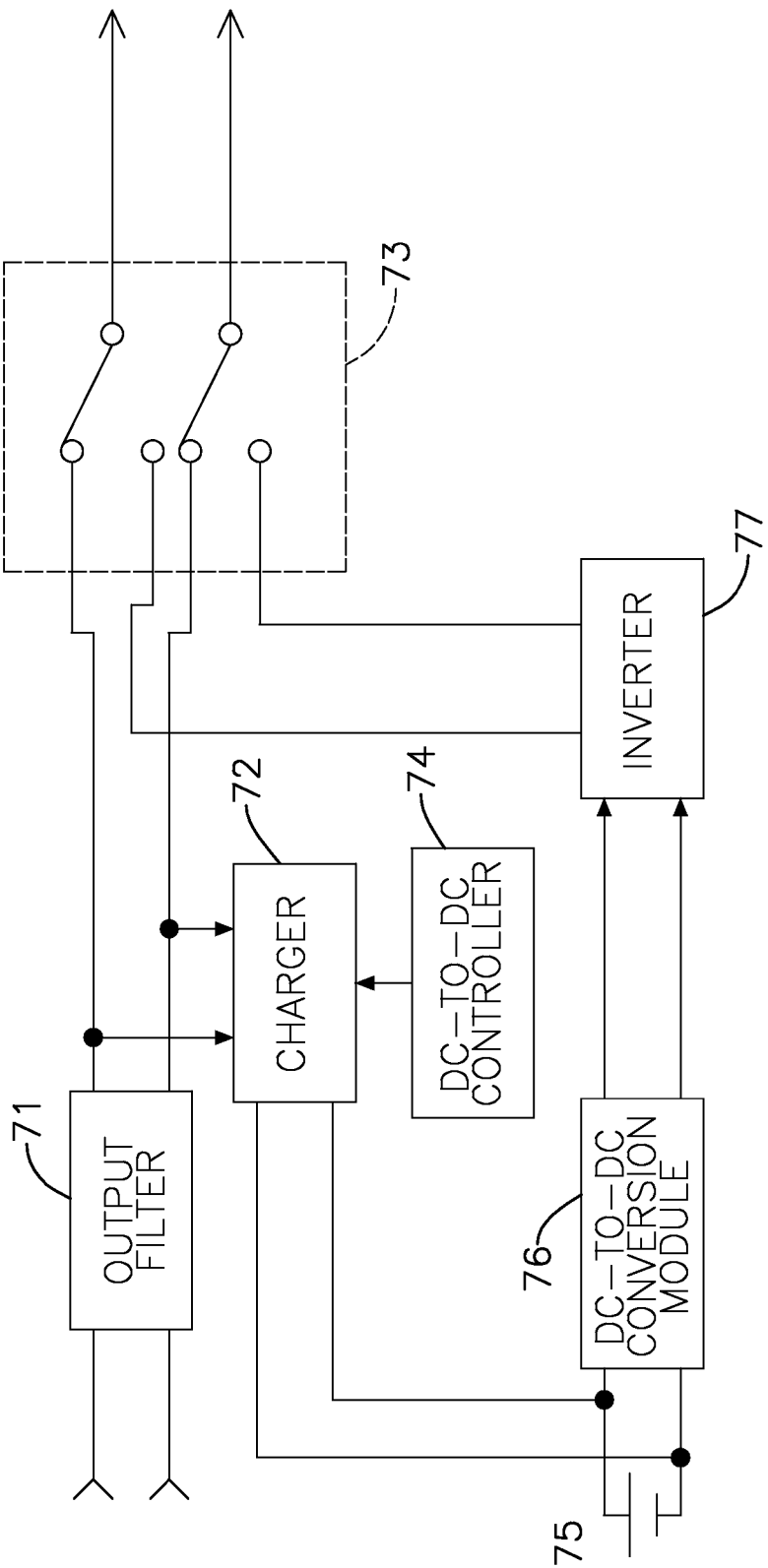
FIG. 4 is a functional block diagram of a conventional off-line UPS.

With reference to FIG. 3, the first charger 11 has a rectification circuit 111 and a flyback converter 112. An input terminal of the rectification circuit 111 is connected to an AC mains. An input terminal of the flyback converter 112 is connected to the output terminal of the rectification circuit 111, and an output terminal thereof is connected to the battery pack 40. The flyback converter 112 has a power switch having a control terminal connected to the DC-to-DC controller 13 and is controlled by the DC-to-DC controller 13.

The DC-to-DC conversion module 20 has a push-pull converter. The push-pull converter has two power switches GA, GB connected to two corresponding driving signal output terminals of the MCU 10 for the MCU 10 to control the power switches GA, GB and duty cycles thereof using pulse width modulation (PWM) signals. Hence, the DC-to-DC conversion module 20 can convert the DC power outputted from the battery pack 40 into pulsating DC voltage.

The DC-to-AC conversion module 30 has four power switches GD, GE, GF, GG connected to four corresponding driving signal output terminals of the MCU 10 for the MCU 10 to selectively turn on two pairs of the power switches GD, GE, GF, GG to convert the pulsating DC voltage outputted from the DC-to-DC conversion module 20 into sinusoidal AC power.

The second charger 12 may has a DC-to-DC converter or a flyback converter. In the present embodiment, the second charger 12 has a flyback converter, which has a power switch GC. The power switch GC may be a MOSFET (Metal oxide semiconductor field effect transistor) having a gate as a control terminal connected to a corresponding driving signal output terminal of the MCU 10. It should be stressed that the second charger 12 differs from the first charger 11 in that the first charger 11 is controlled by the DC-to-DC controller 13 and the second charger 12 is controlled by the MCU 10.

The feedback circuit 14 has multiple operational power amplifiers (OPA) 141~143. An output terminal of each OPA 141~143 is connected to a corresponding feedback terminal of the MCU 10. An input terminal of one of the OPAs 141 is connected to the AC power output terminal of the DC-to-AC conversion module 30 through a current transformer 144. An input terminal of another one of the OPAs 142 is directly connected to the AC power output terminal of the DC-to-AC conversion module 30. An input terminal of yet another one of the OPAs 143 is connected to the first power input terminal of the first charger 11 to detect a condition of the mains power. Accordingly, the MCU 10 can determine operation timing and duty cycle of the second charger 12 according to the mains power and the voltage and current of the AC power outputted from the UPS.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An uninterruptible power supply (UPS) system with energy feedback to chargers and sinusoidal output, comprising:
    a first charger having:
        a first power input terminal adapted to connect to an AC mains; and
        a first power output terminal;
    a battery pack connected to the first power output terminal of the first charger;
    a DC-to-DC conversion module having:
        an input terminal connected to the battery pack; and
        an output terminal;
    a DC-to-AC conversion module having:
        a DC power input terminal connected to the output terminal of the DC-to-DC conversion module; and
        an AC power output terminal;
    a second charger having:
        a second power input terminal connected to the output terminal of the DC-to-DC conversion module;
        a second power output terminal connected to the battery pack; and
        a control terminal;
    a feedback circuit having:
        at least one signal input terminal connected to the AC power output terminal of the DC-to-AC conversion module; and
        at least one feedback signal output terminal;
    a micro-controller unit (MCU) having:
        at least one feedback terminal respectively connected to the at least one feedback signal output terminal of the feedback circuit;
        multiple driving signal output terminals each respectively connected to the DC-to-DC conversion module and the DC-to-AC conversion module; and
        a charging control terminal connected to the control terminal of the second charger.

2. The UPS system as claimed in claim 1, wherein the first charger has a control terminal connected to a DC-to-DC controller.

3. The UPS system as claimed in claim 1, further comprising:
    an input filter having:
        an input terminal adapted to connect to the AC mains; and
        an output terminal connected to the first AC power input terminal of the first charger; and
    a transfer switch having:
        a first contact connected to the output terminal of the input filter;
        a second contact connected to the AC power output terminal of the DC-to-AC conversion module; and
        a common contact serving as a power output terminal switchably connected to the first contact or the second contact.

4. The UPS system as claimed in claim 2, wherein the feedback circuit has multiple operational power amplifiers (OPA), an output terminal of each OPA is connected to a corresponding feedback terminal of the MCU, an input terminal of one of the OPAs is connected to the AC power output terminal of the DC-to-AC conversion module through a current transformer, an input terminal of another one of the OPAs is directly connected to the AC power output terminal of the DC-to-AC conversion module, and an input terminal of yet another one of the OPAs is connected to the first power input terminal of the first charger.

5. The UPS system as claimed in claim 4, wherein the first charger has:
    a rectification circuit, wherein an input terminal of the rectification circuit is adapted to connect to the AC mains; and
    a flyback converter having a power switch having a control terminal connected to the DC-to-DC controller, wherein an input terminal of the flyback converter is connected to an output terminal of the rectification circuit, and an output terminal of the flyback converter is connected to the battery pack.

6. The UPS system as claimed in claim 2, further comprising:
- an input filter having:
  - an input terminal adapted to connect to the AC mains; and
  - an output terminal connected to the AC power input terminal of the first charger; and
- a transfer switch having:
  - a first contact connected to the output terminal of the input filter;
  - a second contact connected to the AC power output terminal of the DC-to-AC conversion module; and
  - a common contact serving as a power output terminal switchably connected to the first contact or the second contact.

7. The UPS system as claimed in claim 4, further comprising:
- an input filter having:
  - an input terminal adapted to connect to the AC mains; and
  - an output terminal connected to the first AC power input terminal of the first charger; and
- a transfer switch having:
  - a first contact connected to the output terminal of the input filter;
  - a second contact connected to the AC power output terminal of the DC-to-AC conversion module; and
  - a common contact serving as a power output terminal switchably connected to the first contact or the second contact.

8. The UPS system as claimed in claim 7, wherein the second charger has a flyback converter having a power switch, and the power switch has a control terminal connected to a corresponding driving signal output terminal of the MCU.

9. The UPS system as claimed in claim 8, wherein the second charger has a DC-to-DC converter.

10. The UPS system as claimed in claim 5, wherein the DC-to-DC conversion module has a push-pull converter having two power switches connected to two corresponding driving signal output terminals of the MCU.

11. The UPS system as claimed in claim 5, further comprising:
- an input filter having:
  - an input terminal adapted to connect to the AC mains; and
  - an output terminal connected to the first AC power input terminal of the first charger; and
- a transfer switch having:
  - a first contact connected to the output terminal of the input filter;
  - a second contact connected to the AC power output terminal of the DC-to-AC conversion module; and
  - a common contact serving as a power output terminal switchably connected to the first contact or the second contact.

12. The UPS system as claimed in claim 10, wherein the DC-to-AC conversion module has four power switches connected to four corresponding driving signal output terminals of the MCU.

13. The UPS system as claimed in claim 12, further comprising:
- an input filter having:
  - an input terminal adapted to connect to the AC mains; and
  - an output terminal connected to the first AC power input terminal of the first charger; and
- a transfer switch having:
  - a first contact connected to the output terminal of the input filter;
  - a second contact connected to the AC power output terminal of the DC-to-AC conversion module; and
  - a common contact serving as a power output terminal switchably connected to the first contact or the second contact.

14. The UPS system as claimed in claim 13, wherein the second charger has a flyback converter having a power switch, and the power switch has a control terminal connected to a corresponding driving signal output terminal of the MCU.

15. The UPS system as claimed in claim 14, wherein the second charger has a DC-to-DC converter.

16. The UPS system as claimed in claim 10, further comprising:
- an input filter having:
  - an input terminal adapted to connect to the AC mains; and
  - an output terminal connected to the first AC power input terminal of the first charger; and
- a transfer switch having:
  - a first contact connected to the output terminal of the input filter;
  - a second contact connected to the AC power output terminal of the DC-to-AC conversion module; and
  - a common contact serving as a power output terminal switchably connected to the first contact or the second contact.

17. The UPS system as claimed in claim 16, wherein the second charger has a flyback converter having a power switch, and the power switch has a control terminal connected to a corresponding driving signal output terminal of the MCU.

18. The UPS system as claimed in claim 17, wherein the second charger has a DC-to-DC converter.

19. The UPS system as claimed in claim 11, wherein the second charger has a flyback converter having a power switch, and the power switch has a control terminal connected to a corresponding driving signal output terminal of the MCU.

20. The UPS system as claimed in claim 19, wherein the second charger has a DC-to-DC converter.

21. The UPS system as claimed in claim 6, wherein the second charger has a flyback converter having a power switch, and the power switch has a control terminal connected to a corresponding driving signal output terminal of the MCU.

22. The UPS system as claimed in claim 21, wherein the second charger has a DC-to-DC converter.

23. The UPS system as claimed in claim 3, wherein the second charger has a flyback converter having a power switch, and the power switch has a control terminal connected to a corresponding driving signal output terminal of the MCU.

24. The UPS system as claimed in claim 23, wherein the second charger has a DC-to-DC converter.

* * * * *